No. 797,559. PATENTED AUG. 22, 1905.
J. H. COOK.
CALIPERS.
APPLICATION FILED JULY 29, 1904.
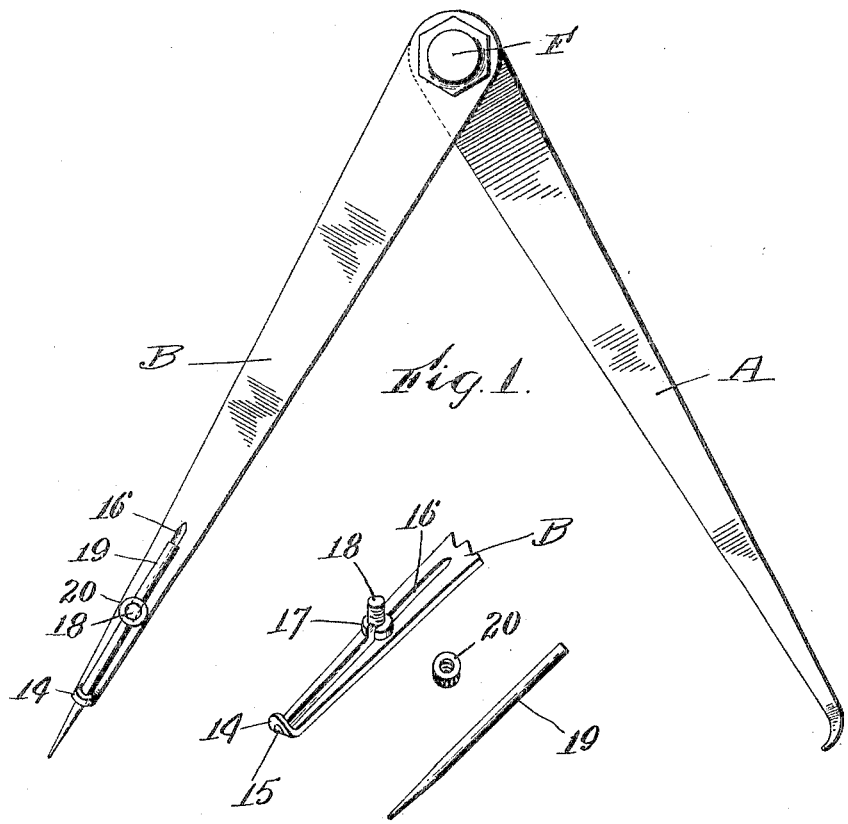
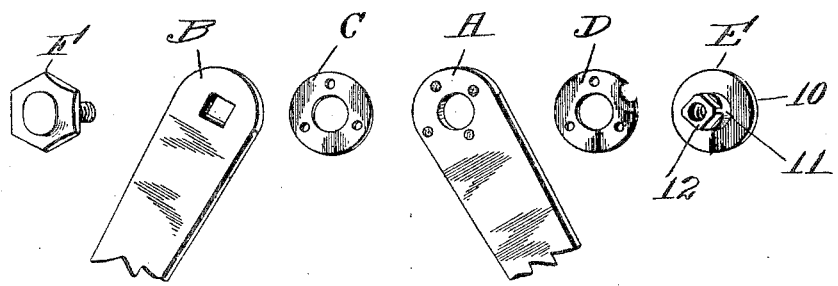
Witnesses:
C. F. Wesson.
M. E. Regan.
Inventor:
J. H. Cook.
By his Attorneys
Luthgate & Luthgate

UNITED STATES PATENT OFFICE.

JAMES H. COOK, OF ATHOL, MASSACHUSETTS, ASSIGNOR TO THE SAWYER TOOL MANUFACTURING COMPANY, OF FITCHBURG, MASSACHUSETTS, A CORPORATION OF MASSACHUSETTS.

CALIPERS.

No. 797,559.  Specification of Letters Patent.  Patented Aug. 22, 1905.

Application filed July 29, 1904. Serial No. 218,681.

*To all whom it may concern:*

Be it known that I, JAMES H. COOK, a citizen of the United States, residing at Athol, in the county of Worcester and State of Massachusetts, have invented a new and useful Calipers, of which the following is a specification.

Calipers and other similar instruments are provided with a friction-joint between two members thereof, which joint may be tightly set, so that the members will be tightly held in their adjusted positions. It has been found desirable to provide a joint of this character with beeswax or some similar compound between the members thereof to prevent wear as the parts are adjusted under the friction and to prevent oxidation in the parts interfering with the smooth action thereof.

The object of this invention is to construct a joint of this character so that it may contain a compound of this nature.

Referring to the drawings, Figure 1 is an elevation of a pair of calipers constructed to embody my improvements. Fig. 2 is a detail view of the parts which make up the adjustable point, and Fig. 3 is a detail view of the parts which make up the adjustable joint.

In detail, A and B designate the two legs of the calipers. The leg A has a round hole bored through the upper end thereof, and the part B has a square hole punched in the upper end thereof. As the joint is assembled a friction-washer C is placed between the two legs A and B and a friction-washer D is placed on the outside of the leg A. A nut E is then inserted through these four parts. This nut has a rim 10 about the size of the washer D, a cylindrical portion 11, which fits in washer D, leg A, and washer C, and a square portion 12, which engages the square hole in leg B. Either or both washers may be omitted in some constructions. A large-headed screw F is threaded into the nut E to make up the joint and the screw is tightly brought to place, so that the joint will have a stiff friction action. It will be seen that as the legs A and B are moved relatively to each other there can be friction between the rim 10 and the washer D, between the washer D and the leg A, between the leg A and the washer C, and between the washer C and the leg B, but that there can be no friction between the leg B and the head of the nut F.

To provide against wear of the joint and to keep the same from oxidation, holes are bored in the washers C and D and in the upper end of the leg A, and these holes are filled with some suitable compound, as beeswax. These holes act as reservoirs or pockets to retain the compound, and this construction will keep the joint in proper shape for a long time and under constant use.

The lower end of the leg B is turned up, as at 14, and a hole 15 is bored through the same. A groove 16 is formed on the side of the leg, as shown. A slotted collar 17 is brazed or secured over the slot 16, and projecting from the same is a screw-threaded shank 18. A point 19 can be inserted in the hole 15, slid up the groove 16, through said collar 17, and held in place by a check-nut 20, threaded on the shank 18. This provides a simple adjusting means for rigidly holding the point in position on the leg B.

The details herein described may be greatly varied by a skilled mechanic without departing from the scope of my invention as expressed in the claims.

Having thus fully described my invention, what I claim, and desire to secure by Letters Patent, is—

1. A calipers or similar instrument made up of two members, one having a circular hole, and the other a non-circular hole, a nut having a circular rim to fit the circular hole in one member, and a non-circular portion to fit the non-circular hole in the other member, a large-headed screw threaded into said nut to hold the members together, and holes in the member which has the circular hole in which a lubricating compound is placed.

2. A calipers or similar instrument made up of two members, one having a circular hole, and the other a non-circular hole, a nut having a circular rim to fit the circular hole in one member, and a non-circular portion to fit the non-circular hole in the other member, a large-headed screw threaded into said nut to hold the members together, a washer interposed between the members, and another washer interposed between the nut and the member having the circular opening, said washers having holes in which a lubricating compound is placed.

In testimony whereof I have hereunto set my hand in the presence of two subscribing witnesses.

JAMES H. COOK.

Witnesses:
JOHN T. CLARKE,
EVAN EVANS.